United States Patent [19]

Kishi

[11] 4,417,805

[45] Nov. 29, 1983

[54] IMAGE SYNTHESIZING DEVICE

[75] Inventor: Hirotoshi Kishi, Tokyo, Japan

[73] Assignee: Canon Kabushiki Kaisha, Tokyo, Japan

[21] Appl. No.: 298,459

[22] Filed: Sep. 1, 1981

[30] Foreign Application Priority Data

Sep. 8, 1980 [JP] Japan .................................. 55-125112

[51] Int. Cl.³ .......................... G03G 15/04; H04N 1/30
[52] U.S. Cl. ..................................... 355/14 R; 355/7;
358/287; 358/300
[58] Field of Search .......................... 355/3 R, 7, 14 R;
358/287, 300

[56] References Cited

U.S. PATENT DOCUMENTS

| | | | |
|---|---|---|---|
| 3,976,982 | 8/1976 | Eiselen | 358/287 X |
| 4,215,929 | 8/1980 | Sato et al. | 355/7 |
| 4,256,400 | 3/1981 | Komori et al. | 355/7 X |
| 4,268,164 | 5/1981 | Yajima et al. | 355/7 X |
| 4,303,332 | 12/1981 | Sakai | 355/7 X |
| 4,340,295 | 7/1982 | Nakamura | 355/7 X |

Primary Examiner—Fred L. Braun
Attorney, Agent, or Firm—Fitzpatrick, Cella, Harper & Scinto

[57] ABSTRACT

An image synthesizing device has an original table, an original reader, a selector for selecting an unnecessary area of the original, a selector for selecting a necessary area of an original to replace the unnecessary area, a comparator for comparing the selected unnecessary area and the necessary area, and a controller for controlling magnification of readout signals of the area when the sizes of the unnecessary area and the necessary area are not in accord.

14 Claims, 4 Drawing Figures

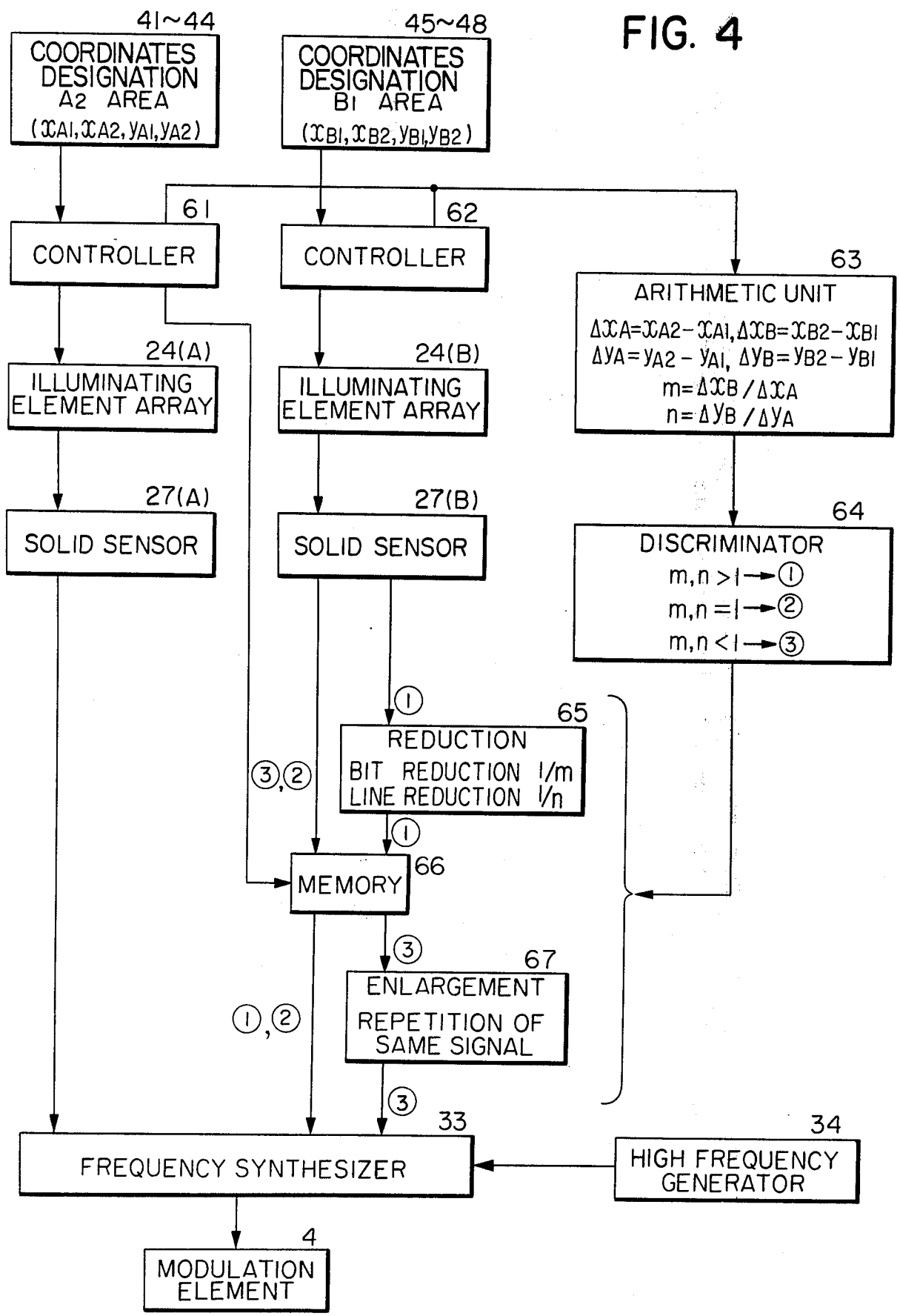

IMAGE SYNTHESIZING DEVICE

BACKGROUND OF THE INVENTION

1. Field of the Invention

The present invention relates to an image synthesizing device and, more particularly, to an image synthesizing device which is capable of selecting desired areas of one or more manuscripts, and providing a synthesized image thereof.

2. Description of the Prior Art

Various devices of the format overlaying type which record data in a predetermined form have been proposed as image devices. Although this type of device is quite effective for certain purposes such as recording outputs from a computer, it has been unsuitable for synthesis of desired areas of manuscripts.

A method has also been proposed for producing a synthesized image from manuscripts by reading out all the data on the manuscripts to be synthesized, storing the data in a memory and editing the data on a CRT display or the like. However, this method requires a large capacity memory and large amounts of time to complete editing, resulting in a complex and bulky processing device and in a complex operating procedure.

The present invention has been made to provide a solution to this problem.

SUMMARY OF THE INVENTION

It is an object of the present invention to provide a novel image synthesizing device.

It is another object of the present invention to provide an image synthesizing device which is capable of easily selecting desired areas of one or more manuscripts to produce a synthesized image.

In order to achieve these objects, the present invention provides an image synthesizing device comprising a manuscript table, means for reading a manuscript on the manuscript table, means for selecting an unnecessary area of the manuscript, means for selecting a necessary area of the manuscript to be synthesized in the unnecessary area, means for comparing the selected unnecessary area and necessary area, and means for controlling the magnification of readout signals of the necessary area if the sizes of the unnecessary area and the necessary area do not match.

Other objects and features of the present invention will become apparent to those skilled in the art from the following description of the preferred embodiment of the present invention.

BRIEF DESCRIPTION OF THE DRAWINGS

FIG. 4 is a block diagram of the device shown in FIG. 2.

DESCRIPTION OF THE PREFERRED EMBODIMENT

Figure 1:
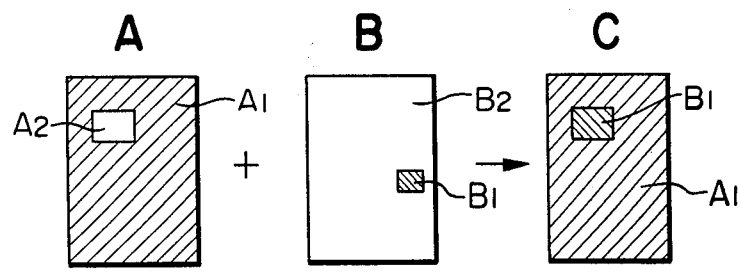
FIG. 1 is a schematic view showing the principle of image synthesis according to the present invention.

FIG. 1 is a view showing the principle of image synthesis according to the present invention. For example, an area A1 and an area B1 are selected from a first manuscript (original) A and a second manuscript B, respectively, which are combined with each other to produce an image C. In this image synthesis, if the sizes of areas A2 and B1 do not match, when deleting the area A2 of the first manuscript A (leaving the area A1) and inserting the area B1 of the second manuscript B where the unnecessary area A2 was, the magnification is changed so that they may match in the synthesized image C. In this manner, according to the device of the present invention, the selected areas of the manuscripts are not simply combined; the photocopied image C is obtained by inserting the necessary area B1 of the second manuscript B in the unnecessary area A2 of the first manuscript A.

In this manner, even if the size of the necessary area B1 of the second manuscript B is different from that of the unnecessary area A2 of the first manuscript A, the necessary area B1 is corrected in size so that it may be inserted where the unnecessary area A2 was to provide a synthesized photocopy.

Figure 2:
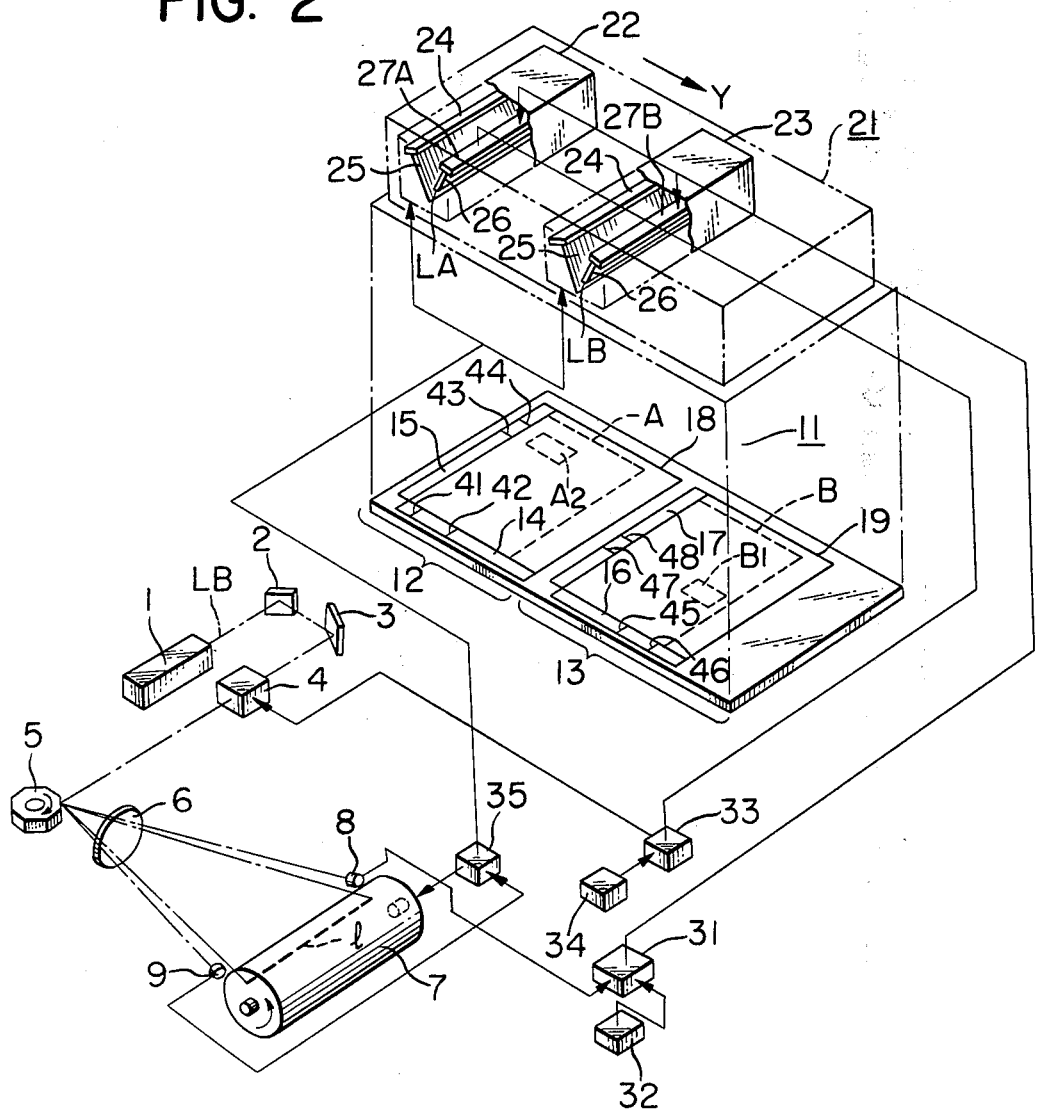
FIG. 2 is a schematic view showing an image synthesizing device according to the present invention.

FIG. 2 is a schematic perspective view showing an image synthesizing device according to the present invention. Referring to FIG. 2, a laser beam LB radiated from a laser 1 is reflected by reflectors 2 and 3 and becomes incident on a modulation element 4. The laser beam which passes through the modulation element 4 becomes incident on a rotary polyhedral mirror 5 to be reflected thereby. The reflected laser beam is then transmitted through an $f\theta$ lens system 6 which focuses the laser beam to a spot. During the synthesis, the rotary polyhedral mirror 5 is rotated by a drive motor (not shown) at a predetermined high angular speed in the direction shown by the arrow. The laser beam which is reflected by this rotary mirror is periodically deflected within a plane. Thus, the light spot of the laser beam focused by the $f\theta$ lens system 6 moves along a fixed line. This fixed line is referred to as a reading main scanning line l.

A photosensitive drum 7 is so arranged as to be rotatable in the direction shown by the arrow. Part of the circumferential surface of the photosensitive drum 7 coincides with the main scanning line l which is parallel to the axis of rotation of the drum in the horizontal plane. The direction of movement of the circumferential surface of the photosensitive drum 7 due to the rotation thereof is referred to as a reading subscanning line.

A manuscript table 11 of the image synthesizing device of the present invention has manuscript receiving surfaces 12 and 13. Manuscript receiving references 14, 15, 16 and 17 are arranged on the manuscript receiving surfaces 12 and 13. The manuscript receiving references 14 and 16 on the manuscript receiving surfaces 12 and 13 are in the main scanning direction for reading out of the manuscript. On the other hand, the manuscript receiving references 15 and 17 are the manuscript receiving references in the subscanning direction. The first and second manuscripts A and B to be photocopied are placed on the manuscript receiving surfaces 12 and 13 so that the surfaces of the manuscripts to be photocopied face upwardly. The edges of the manuscripts A and B are aligned with the references 14, 15, 16 and 17 of the manuscript receiving surfaces. Setting of the manuscripts is completed by covering their surfaces with transparent members 18 and 19. Selection of the data of manuscripts A and B set in this manner may be easily performed by designating coordinates in the main scanning direction and the subscanning direction of reading with designation controls 41 to 48 of a coordinate designating device, to be described later, which is assembled with the manuscript receiving references 14, 15, 16 and 17.

A manuscript scanning unit 21 for reading out the data of the manuscripts is arranged in opposition to the manuscript table 11. The manuscript scanning unit 21 has scanning units 22 and 23 corresponding to the manuscript receiving surfaces 12 and 13 of the manuscript table 11. Each of the scanning units 22 and 23 has a high-density light-emitting array 24, an optical fiber 25, a short focal point lens array 26, and elongate solid sensors 27A and 27B. During the photocopying operation, the scanning units 22 and 23 are moved as a unit by a drive motor (not shown) in the direction shown by arrow Y. The direction shown by the arrow Y will be denoted as the subscanning direction. Main scanning lines LA and LB are set in the manuscript scanning planes of the scanning units 22 and 23. The main scanning lines LA and LB are fixed lines where the main scanning of the manuscript parts along these lines is performed.

The elongate solid sensors 27A and 27B of the respective scanning units 22 and 23 are each formed by arranging a number of small photosensitive elements in a row in one direction to provide a self-scanning function. The photosensitive regions of the solid sensors 27A and 27B correspond to the main scanning lines LA and LB and are arranged to be parallel to the main scanning lines LA and LB. The manuscript parts on the main scanning lines LA and LB are illuminated by an illuminating part consisting of the high-density light-emitting array 24 and the optical fiber 25 and are imaged on the photosensitive regions through the short focal length lens array 26. The light-emitting elements constituting the light-emitting array 26 may be separately controlled for flashing independently of each another. The control for individual flashing is performed through a coordinate designating device assembled in the manuscript receiving references 14, 15, 16 and 17 described above. This control will be described in more detail hereinafter.

When the images of the manuscript parts along the main scanning lines LA and LB are formed on the photosensitive regions of the elongate solid sensors 27A and 27B, a photovoltage corresponding to the intensity of the incident light is generated in the individual photosensitive elements of the sensors. These photovoltages are sequentially converted into time-serial signals according to the order of arrangement of the photosensitive elements by the self-scanning functions of the elongate solid sensors 27A and 27B, when drive pulses are applied to the elongate solid sensors 27A and 27B.

A drive pulse is applied to each of the elongate solid sensors 27A and 27B in the manner to be described below. A photodetector 8 is arranged in the vicinity of the starting point for movement of the light spot of the laser beam formed by the fθ lens system 6 to receive the focused laser beam. The photodetector 8 is effective to sense the initiation of the main reading scanning. The output of the photodetector 8 is amplified and is then applied to a clock gate 31 to which are supplied clock pulses from a clock pulse generator 32. When the signal from the photodetector 8 is applied to the clock gate 31, the clock gate 31 is opened to output the clock pulses. These clock pulses are applied as the drive pulses described above to the elongate solid sensors 27A and 27B. The photodetector 8, the clock gate 31, and the clock pulse generator 32 constitute a scanning synchronizing means. Immediately upon application of the drive pulses, the elongate solid sensors 27A and 27B start self-scanning.

The outputs of the elongate solid sensors 27A and 27B are amplified and are then applied to a frequency synthesizer 33. A high frequency carrier generated by a high frequency generator 34 is applied to the frequency synthesizer 33. The high frequency carrier is modulated by the output signals of the elongate solid sensors 27A and 27B to become a high frequency signal corresponding to these output signals. This high frequency signal is then output from the frequency synthesizer 33, amplified, and applied to the modulation element 4.

Another photodetector 9 is arranged to receive the focused laser beam in the vicinity of the point for terminating the movement of the light spot of the laser beam along the reading main scanning line l This photodetector 9 serves to detect the completion of one reading main scanning operation. The output of the photodetector 9 is applied to a displacement synchronization controller 35. Based upon the signals from the photodetector 9, the movement synchronization controller 35 synchronizes the rotation of the photosensitive drum 7 with the rotation of the drive motor (not shown) for the manuscript scanning units 22 and 23.

The electrostatic latent image formed on the photosensitive drum 7 is a negative image of the manuscripts. Therefore, a positive image of the manuscripts may be formed on the photosensitive drum 7 by reversal development by a reversal development device (not shown). This positive image is transferred to a recording sheet (not shown) by a conventional visible image transfer device. The recording sheet is processed in a similar manner as in the conventional electrophotographic process and is output from the device as a photocopy. After the visible image transfer, the photosensitive drum 7 is desensitized and cleaned according to the conventional electrophotographic process.

Figure 3:
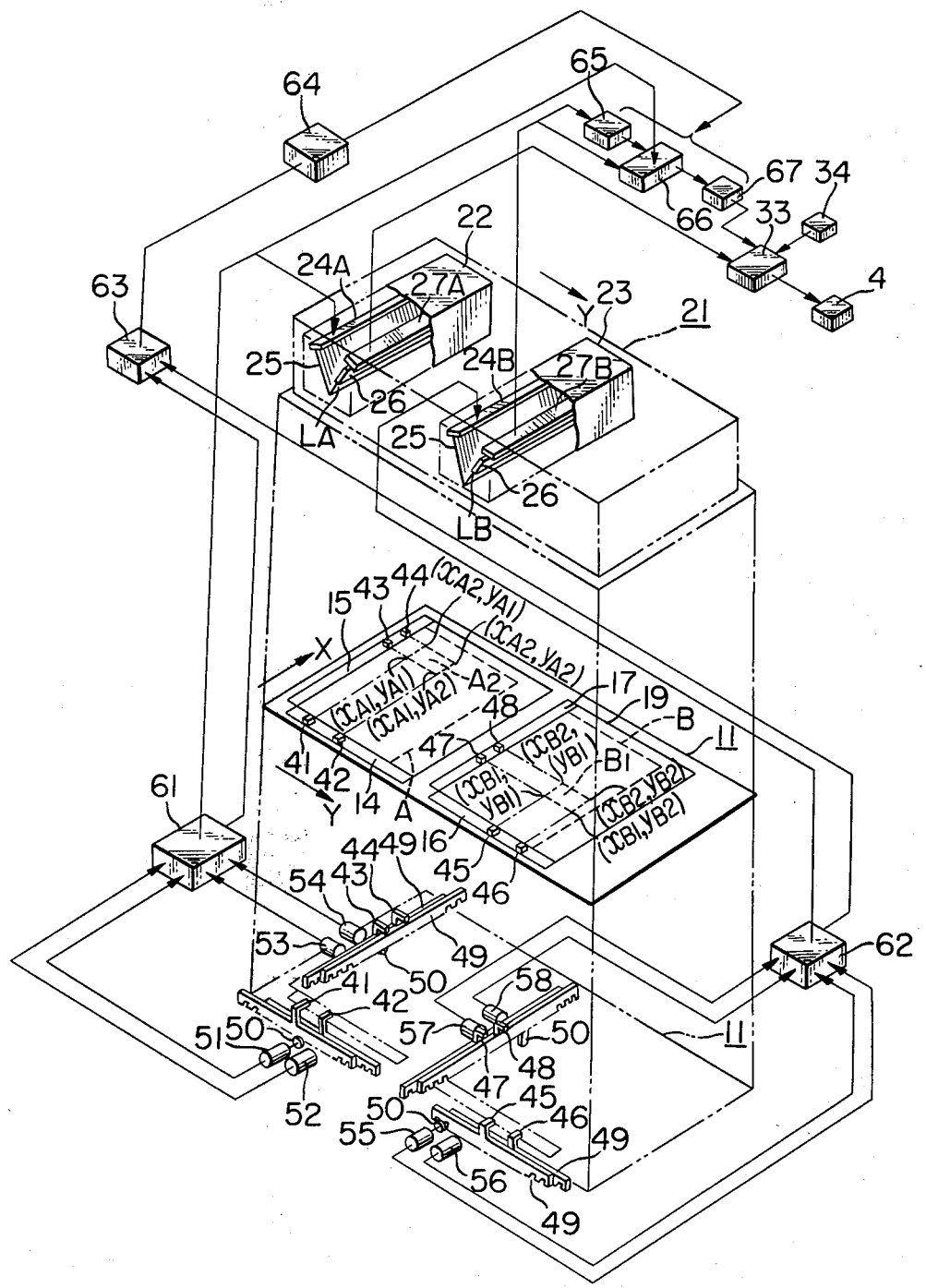
FIG. 3 is a view showing the control system for designation of areas of manuscripts according to the device shown in FIG. 2.

The overall construction of the device has been described above. Synthesis of the image will now be described with reference to FIG. 3.

As in the case of FIG. 1, for the purpose of illustration the area A1 of the first manuscript A is the necessary part and the area A2 is the unnecessary part. The area B1 of the second manuscript B is the necessary part and the area B2 is the unnecessary part. The new image C is to be formed by combining these manuscripts A and B.

The first manuscript A is placed on the manuscript receiving surface 12 of the manuscript table 11 with its surface to be photocopied facing upwardly and with its edges aligned with the manuscript receiving standards 14 and 15. The second manuscript B is placed on the manuscript receiving surface 3 with its surface to be photocopied facing upwardly and with its edges aligned with the manuscript receiving references 16 and 17. The transparent members 18 and 19 are placed over the manuscripts thus set to cover and securely hold them.

While the two manuscripts A and B thus set are visually observed, the designation controls 41 to 48 arranged at the respective manuscript receiving references 14, 15, 16 and 17 are slid along these respective references. In this manner, the coordinates of the areas A1 and B1 of the manuscripts A and B are designated in the main scanning direction (X direction in the drawing) and in the subscanning direction (Y direction in the drawing). More specifically, YA1 is designated with the designation control 41; YA2, by the designation control 42; XA1, by the designation control 43; XA2, by the designation control 44; YB1, by the designation control 45; YB2, by the designation control 46; XB1, by the designation control 47; and XB2, by the designation control 48. The designation controls 41 to 48 respectively have racks 49. Shaft encoders 51 to 58 are arranged through pinions 50 meshing with these racks 49. Therefore, the shaft encoders 51 to 54 and 55 to 58 are arranged in correspondence with the designation controls 41 to 44 and 45 to 48. The output signals from the shaft encoders 51 to 54 at the side of the manuscript receiving surface 12 are input to a controller 61. The output signals from the shaft encoders 55 to 58 at the side of the manuscript receiving surface 13 are input to a controller 62. The flashing of high-density light-emitting arrays 24A and 24B is controlled by these controllers 61 and 62. At the scanning unit 22 corresponding to the manuscript A, the light-emitting array at the region surrounded by the designation controls 41, 42, 43 and 44 is kept off. At the scanning unit 23 corresponding to the manuscript B, the light-emitting array surrounded by the designation controls 45, 46, 47 and 48 is kept on, but the array is kept off at the other regions. That is, while the main scanning line LA subscans between YA1 and YA2 of the manuscript A, the controller 61 controls the light-emitting elements of the high-density light-emitting array 24A which are located between XA1 and XA2 to be deenergized. Therefore, the manuscript A is exposed, except for the area A2.

Only while the main scanning line LB of the scanning unit 23 subscans between YB1 and YB2, the controller 62 controls the light-emitting elements of the high-density light-emitting array 24B which are located between XB1 and XB2 to be energized. Therefore, the manuscript B is not exposed, except for the area B1.

The output signals of the shaft encoders 51 to 54 and 55 to 58 are input to an arithmetic unit 63 through the controllers 61 and 62, respectively. The arithmetic unit 63, upon reception of both these inputs, performs operations of $\Delta XA = XA2 - XA1$, $\Delta YA = YA2 - YA1$, $\Delta XB = XB2 - XB1$, $\Delta YB = YB2 - YB1$, $m = \Delta XB/\Delta XA$, and $n = \Delta YB/\Delta YA$. The operation results for m and n are input to a discriminator 64 to discriminate if m and n are equal to 1, greater than 1, or less than 1. The processing step to follow is selected according to the discrimination results obtained.

For example, FIG. 4 shows an example of the controller which selects the processing step according to cases of $m,n < 1$ (step 1), $m,n = 1$ (step 2), and $m,n < 1$ (step 3).

If the discriminator 64 discriminates that $m,n > 1$ (step 1), that is, if the necessary area B1 is larger than the unnecessary area A1, the output signals of the area B1 from the solid sensor 27B are bit-reduced to 1/m according to the magnification factor m in the direction of main scanning, and are also line-reduced to 1/n according to the magnification factor n in the direction of subscanning. The obtained data is stored in a memory 66.

If $m,n = 1$ or $m,n < 1$ (step 2 or 3), that is, if the size of the area A2 is the same or greater than the size of the necessary area B1, the output signals of the area B1 from the solid sensor 27B are not subjected to the processing as in the case of (step 1) and are directly stored in the memory 66.

The signals stored in the memory 66 are input to the frequency synthesizer 33 during reading. No processing is performed in the cases of step 1 and step 2. On the other hand, in the case of step 3, input is performed such that the same magnification factor of 1 bit is repeated after every predetermined number of bits, and the same one scanning operation is repeated after every group of several scanning operations.

For example, if $m = 4/5$ and $n = \frac{3}{4}$, the same signals are repeated for one bit after every 4 bits, and the same scanning operation is repeated at the rate of one scanning operation for every 3 scanning operations.

The timing control for starting reading out from the memory 66 is performed by the output signal from the controller 61. For example, while the main scanning line LA of the scanning unit 22 subscans between YA1 and YA2, the controller 61 generates a signal for initiating the reading out of the data which is read out by the elongate solid sensor 27B and is stored in the memory 66, every time the elongate solid sensor 27A completes one self-scanning operation up to $(XA-1)$ times.

In this manner, the necessary data of the manuscripts A and B are input to the frequency synthesizer 33 under the condition that they may be readily synthesized.

The output of the frequency synthesizer 33 is input to the modulation element 4.

The laser beam is modulated by the modulation element 4 and the synthesized image C obtained from the combination of the selected areas A1 and B1 of the manuscripts A and B is recorded on the photosensitive drum 7. The recorded image is fixed on the recording sheet by a suitable recording method, for example, the electrophotographic process. Meanwhile, the scanning units 22 and 23 which have completed the predetermined scanning operations are restored to the initial positions for subsequent image synthesis processing. Although two scanning units were used in the embodiment described above, only one scanning unit may alternatively be used. Furthermore, it is to be understood that more than two scanning units may be used for the manuscript table. In the embodiment described above, only a pair of designation controls were used for each of the X and Y directions of each of the manuscript receiving surfaces. However, another pair may be added to each of the X and Y directions in order to designate two areas of each manuscript as necessary and unnecessary areas. In this case, not only the synthesis of a plurality of manuscripts may be performed, but replacement of areas of the same manuscript may also be performed. This will allow easy recomposition of photographs or the like during editing of a single surface of newspapers, magazines, advertisements and so on.

In the embodiment described above, the magnification factors, for the second manuscript were independently corrected in the direction of main scanning and in the direction of subscanning. However, as a modification, it is also possible to assign priority to either the direction of main scanning or the direction of subscanning so that the magnification factor for the direction with priority may be similarly applied to the other direction.

In the embodiment described above, the synthesizing image signals were directly guided to the laser modulation element. However, it is to be understood that these synthesizing image signals may be converted into currents or voltages and transferred to a remote place for recording at the remote place. As the recording method other than the electrophotographic process, any process such as electrostatic recording, ink-jet recording, or the like may be adopted as long as recording may be accomplished according to the modulation signal.

In summary, according to the present invention, an image synthesizing device for selecting predetermined areas of a plurality of manuscripts for synthesis of these areas is characterized in that the size of an unnecessary area of a first manuscript is compared with the size of a necessary area of a second manuscript which is to be inserted into the blank area where the unnecessary area of the first manuscript was, and, if necessary, the magnification factor of the necessary area of the second manuscript is corrected to accommodate it in the blank area of the first manuscript.

According to this construction, desired areas of different manuscripts may be combined, and synthesized images of excellent quality may be obtained even if the sizes of the selected areas are different.

What I claim is:

1. An image synthesizing device comprising an original table, means for reading an original on said original table, means for selecting an unnecessary area of the original, means for selecting a necessary area of an original to be synthesized in said unnecessary area, means for comparing the sizes of said selected unnecessary area and said necessary area, and means for controlling magnification of readout signals of said necessary area if the sizes of said unnecessary area and said necessary area do not match.

2. A device accordig to claim 1 wherein, when said comparing means detects that the size of said necessary area is greater than the size of said unnecessary area, said magnification controlling means reduces said readout signals of said necessary area.

3. A device according to claim 1 wherein, when said comparing means detects that the size of said necessary area is smaller than the size of said unnecessary area, said magnification controlling means enlarges said readout signals of said necessary area.

4. A device according to claim 2 or 3, wherein said original reading means has a light-emitting array.

5. A device according to claim 4, wherein said light-emitting array is controlled in accordance with selection by said selecting means.

6. A device according to claim 1, wherein said original table has a planar original receiving surface.

7. A device according to claim 6, wherein said selecting means has a plurality of designating members which are respectively displaceable in two orthogonal directions on said original receiving surface.

8. A device according to claim 7, wherein said selecting means has encoders for converting positions selected by said designating members into electric signals.

9. An image synthesizing device comprising:
a plurality of original receiving surfaces;
means for reading a plurality of originals;
means for designating an unnecessary area of one original when placed on one of said original receiving surfaces;
means for designating a necessary area of another original when placed on another of said original receiving surfaces;
means for comparing the size of said unnecessary area with the size of said necessary area; and
means for controlling readout signals of said necessary area if the sizes of said unnecessary area and said necessary area do not match.

10. A device according to claim 9 wherein, when said comparing means detects that the size of said necessary area is greater than the size of said unnecessary area, said magnification controlling means reduces said readout signals of said necessary area.

11. A device according to claim 9 wherein, when said comparing means detects that the size of said necessary area is smaller than the size of said unnecessary area, said controlling means enlarges said readout signals of said necessary area.

12. A device according to claim 9, wherein said reading means has a plurality of reading scanning units corresponding to the number of said plurality of original receiving surfaces.

13. A device according to claim 12, wherein said reading scanning units have light-emitting arrays.

14. A device according to claim 13, wherein light-emitting operations of said light-emitting arrays of said reading scanning units are controlled according to the operation of said designating means.

* * * * *

UNITED STATES PATENT AND TRADEMARK OFFICE
CERTIFICATE OF CORRECTION

PATENT NO. : 4,417,805
DATED : November 29, 1983
INVENTOR(S) : HIROTOSHI KISHI

It is certified that error appears in the above-identified patent and that said Letters Patent is hereby corrected as shown below:

Column 5

Line 49, change "m,n < 1", first occurrence, to --m,n > 1--.

Line 53, change "A1" to --A2--.

Column 8, line 27
(Claim 10, line 4)

Delete "magnification".

Signed and Sealed this

Twenty-fourth Day of July 1984

[SEAL]

Attest:

GERALD J. MOSSINGHOFF

Attesting Officer

Commissioner of Patents and Trademarks